(12) United States Patent
Lopez et al.

(10) Patent No.: US 10,365,122 B2
(45) Date of Patent: Jul. 30, 2019

(54) DEVICE FOR MONITORING TEMPERATURE AND TIGHTENING OF A SCREW

(71) Applicant: Schneider Electric Industries SAS, Rueil Malmaison (FR)

(72) Inventors: Josep Lopez, Montgat (ES); Alain Perrin, Vif-Saint Nicolas de Macherin (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 139 days.

(21) Appl. No.: 15/267,477

(22) Filed: Sep. 16, 2016

(65) Prior Publication Data
US 2017/0089727 A1 Mar. 30, 2017

(30) Foreign Application Priority Data
Sep. 25, 2015 (FR) ..................... 15 59043

(51) Int. Cl.
*G01D 5/14* (2006.01)
*G01K 7/22* (2006.01)
(Continued)

(52) U.S. Cl.
CPC ............ *G01D 5/145* (2013.01); *F16B 31/02* (2013.01); *G01K 7/22* (2013.01); *H01R 4/34* (2013.01); *H01R 4/302* (2013.01)

(58) Field of Classification Search
CPC G01N 25/16; G01N 3/08; G01K 1/14; G01K 7/22; G01D 5/145; H01R 4/34; H01R 4/302; F16B 31/02
(Continued)

(56) References Cited

U.S. PATENT DOCUMENTS 4,963,851 A * 10/1990 Okano ................... H01H 37/46
337/393
5,309,133 A * 5/1994 Berger ................... G01K 7/183
338/22 R
(Continued)

FOREIGN PATENT DOCUMENTS

CN 203637587 U * 6/2014
EP 1 462 220 A1 9/2004
(Continued)

OTHER PUBLICATIONS

W)2013114687A1. Aug. 8, 2013.*
(Continued)

*Primary Examiner* — Gail Kaplan Verbitsky
(74) *Attorney, Agent, or Firm* — Oblon, McClelland, Maier & Neustadt, L.L.P.

(57) ABSTRACT

A device for monitoring the temperature and tightening of a screw includes a temperature detector positioned near the screw head for measuring the temperature of the screw, a detector of the tightening of the screw, including a sensor member including a first part, positioned on the screw head so as to be rotationally fixed to the screw, and a second part, fixed relative to the first part and arranged to generate a detection state representing a position of the first part relative to the second part, and a first detection unit connected to the sensor member and arranged to determine a degree of tightening of the screw as a function of the detection state of the sensor member.

15 Claims, 2 Drawing Sheets

(51) Int. Cl.
*H01R 4/34* (2006.01)
*F16B 31/02* (2006.01)
*H01R 4/30* (2006.01)

(58) Field of Classification Search
USPC .............. 374/4, 5, 7, 187, 188, 195, 198, 55
See application file for complete search history.

(56) References Cited

U.S. PATENT DOCUMENTS

| | | | | |
|---|---|---|---|---|
| 5,970,798 | A * | 10/1999 | Gleman | G01L 5/246 |
| | | | | 73/761 |
| 6,322,378 | B1 * | 11/2001 | Auclair | H01R 13/5812 |
| | | | | 439/98 |
| 7,228,210 | B2 | 6/2007 | Davis | G07C 5/008 |
| | | | | 340/438 |
| 7,293,466 | B2 * | 11/2007 | Ohta | F16B 31/02 |
| | | | | 257/417 |
| 2004/0187652 | A1 | 9/2004 | Pyre et al. | |
| 2004/0245779 | A1 * | 12/2004 | Russell | F16L 15/08 |
| | | | | 285/354 |
| 2005/0172725 | A1 * | 8/2005 | Gleman | F16B 31/02 |
| | | | | 73/761 |
| 2006/0156844 | A1 * | 7/2006 | Yamashita | F16H 25/2214 |
| | | | | 74/424.86 |
| 2008/0055113 | A1 * | 3/2008 | Muro | G06Q 10/00 |
| | | | | 340/870.16 |
| 2011/0181393 | A1 | 7/2011 | Tillotson et al. | |
| 2012/0013471 | A1 * | 1/2012 | Jones | G01K 7/00 |
| | | | | 340/584 |
| 2013/0228405 | A1 * | 9/2013 | Tsai | B62K 23/06 |
| | | | | 188/344 |
| 2014/0000373 | A1 * | 1/2014 | Soma' | G01M 7/00 |
| | | | | 73/658 |
| 2014/0320302 | A1 | 10/2014 | Tillotson et al. | |
| 2016/0037955 | A1 * | 2/2016 | Kim | A47J 27/57 |
| | | | | 99/344 |
| 2016/0370268 | A1 * | 12/2016 | Kondo | H01H 35/006 |
| 2017/0019741 | A1 * | 1/2017 | Lacirignola | G10L 21/0208 |
| 2017/0138387 | A1 * | 5/2017 | Saigo | F16B 31/02 |
| 2017/0197302 | A1 * | 7/2017 | Kobayashi | B25B 23/14 |
| 2017/0218999 | A1 * | 8/2017 | Brown | E04D 1/34 |
| 2018/0073542 | A1 * | 3/2018 | Saigo | F16B 31/02 |
| 2018/0107947 | A1 * | 4/2018 | Ogawa | G06N 20/00 |

FOREIGN PATENT DOCUMENTS

| | | | |
|---|---|---|---|
| FR | 2 497 347 | A1 | 7/1982 |
| FR | 2 975 232 | A1 | 11/2012 |
| JP | 407243399 | A * | 9/1995 |
| JP | 0733085 | A * | 12/1995 |
| WO | WO 2011/090539 | A1 | 7/2011 |

OTHER PUBLICATIONS

French Preliminary Search Report dated Aug. 4, 2016 in French Application 15 59043, filed Sep. 25, 2015 (with English Translation of Categories of Cited Documents).

* cited by examiner

DEVICE FOR MONITORING TEMPERATURE AND TIGHTENING OF A SCREW

TECHNICAL FIELD OF THE INVENTION

The present invention relates to a device for monitoring the temperature and tightening of a screw. The screw is used, for example, in an electrical connection terminal or on a conducting bar of a busbar system to clamp an electrical conductor.

PRIOR ART

It is increasingly necessary to be able to determine rapidly the state of an electrical installation, for example an installation located in an electrical enclosure. The operator carrying out an inspection must be able to rapidly retrieve a certain amount of information relating to the state of the inspected installation. At the present time, however, some information may not always be readily readable, and a number of operations have to be performed. This is the case, for example, with information relating to screws used in an electrical installation, for example on the electrical terminals or the conducting bars of a busbar system. This information concerns the temperature of the screw at its head and its degree of tightening. It is essential to monitor these parameters in order to obtain assurance of the correct operation of the installation.

The object of the invention is therefore to propose a device for monitoring the temperature and tightening of a screw, for example a screw used in a terminal or on a conducting bar of a busbar system.

DISCLOSURE OF THE INVENTION

This object is achieved by a device for monitoring the temperature and tightening of a screw, said screw comprising at least a head and a shank and being designed to clamp one or more electrical conductors, said device comprising:
 a temperature detector positioned near the screw head for measuring the temperature of the screw,
 a detector of the tightening of the screw, comprising a sensor member including a first part, positioned on the screw head so as to be rotationally fixed to said screw, and a second part, fixed relative to the first part and arranged to generate a detection state representing a position of the first part relative to the second part, and a first detection unit connected to the sensor member and arranged to determine a degree of tightening of the screw as a function of the detection state of the sensor member.

According to a particular feature, the sensor member comprises a permanent magnet mounted on a cap fastened to the screw head.

According to another particular feature, the sensor member comprises a Hall effect sensor arranged to measure the magnetic field generated by said permanent magnet.

According to another particular feature, the sensor member comprises one or more magnetically operated microswitches.

According to another particular feature, the temperature detector comprises a component of the thermistor type connected to a second detection unit.

According to another particular feature, the device comprises a signalling unit, connected to an output of the first detection unit and to an output of the second detection unit, and arranged to signal a screw tightening state supplied by the first detection unit and/or a temperature state supplied by the second detection unit.

According to another particular feature, the device comprises a main housing which accommodates:
 the first detection unit and the second detection unit, and said signalling unit.

According to another particular feature, the temperature detector is fastened to said main housing.

According to another particular feature, the device comprises an electrical power supply system arranged to supply electricity to the temperature detector, to the first detection unit, to the second detection unit and to the signalling unit.

According to another particular feature, the power supply system comprises an inductive electrical energy generator comprising at least a current transformer having a core to be placed around said electrical conductor forming the primary of the transformer, and a winding provided around the core and forming the secondary of said transformer, to recover electrical energy when an electric current flows in the electrical conductor.

According to another particular feature, the core is shaped in the form of a torus designed to surround the electrical conductor.

According to another particular feature, the device comprises an electronic circuit connected to the secondary of the transformer, the electronic circuit having means for storing the generated electrical energy.

BRIEF DESCRIPTION OF THE DRAWINGS

Other characteristics and advantages will be apparent from the following detailed description, which refers to the attached drawings, in which.

DETAILED DESCRIPTION OF AT LEAST ONE EMBODIMENT

Figure 1:
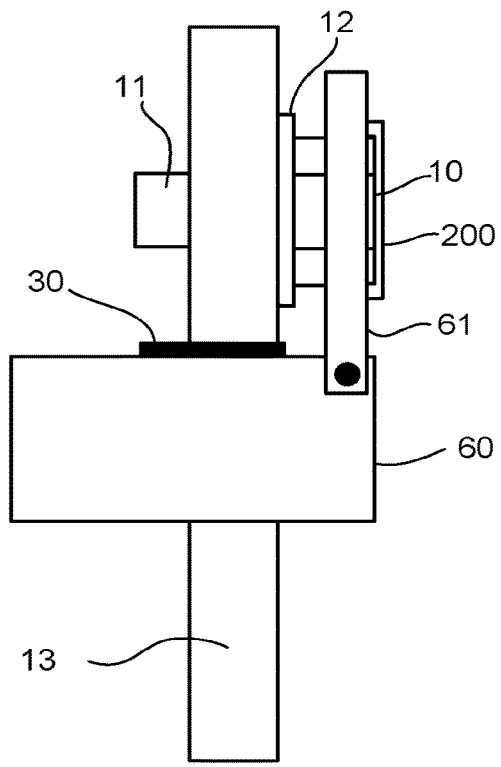
FIG. 1 shows, in a side view and in a schematic manner, the device of the invention installed on a clamping screw on a conducting bar.

The invention is intended to determine the temperature at a clamping screw and its degree of tightening when it is used in the electrical engineering field, notably to clamp an electrical conductor on to a terminal of an electrical apparatus or on to a conducting bar of a busbar system.

In a known way, a screw used in the electrical engineering field comprises a screw head 10 and a shank 11 having an external thread. A washer 12 may if necessary be positioned between the screw and the clamp of a terminal or the conducting bar. A nut 14 may be provided at the end of the shank opposite the head. In the rest of the description and in the figures, it is assumed that the screw is to be used for clamping a conductor (not shown) on to a conducting bar 13.

The device of the invention thus comprises:
 a tightening detector for determining the degree of tightening of the screw, and a temperature detector for measuring the temperature at the screw head.

Figure 3:
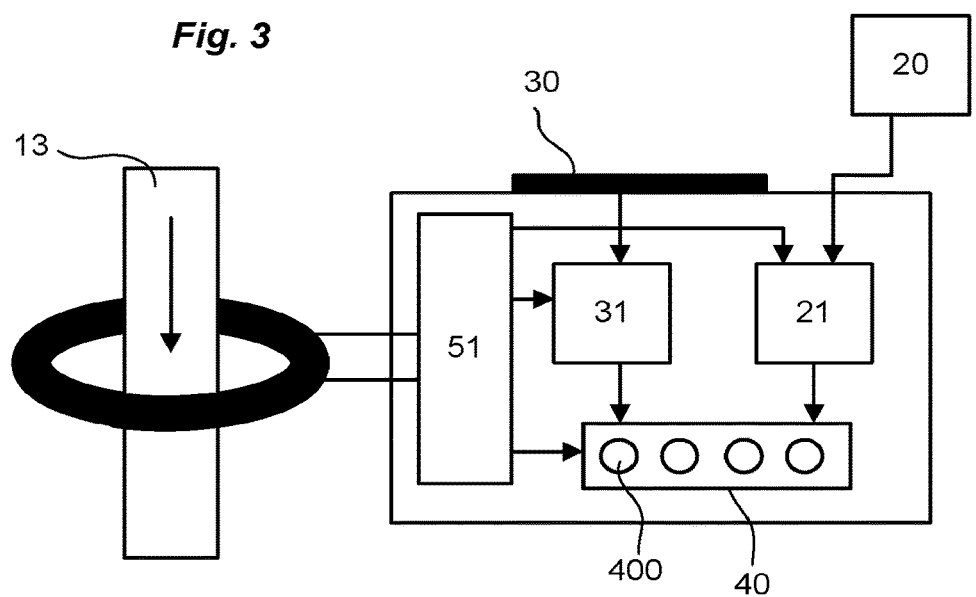
FIG. 3 illustrates in a diagram the architecture of the device of the invention.

The tightening detector comprises a sensor member 20 and a first detection unit 21 (FIG. 3). The sensor member 20 comprises a first part, fastened to the screw head and rotationally fixed to the latter, and a second part, for determining the position of the first part in order to generate a detection state representing a position of the first part relative to the second part. The first detection unit 21 comprises an input to which the sensor member 20 is connected, for the purpose of receiving said detection state supplied by the sensor member 20.

Figure 2:
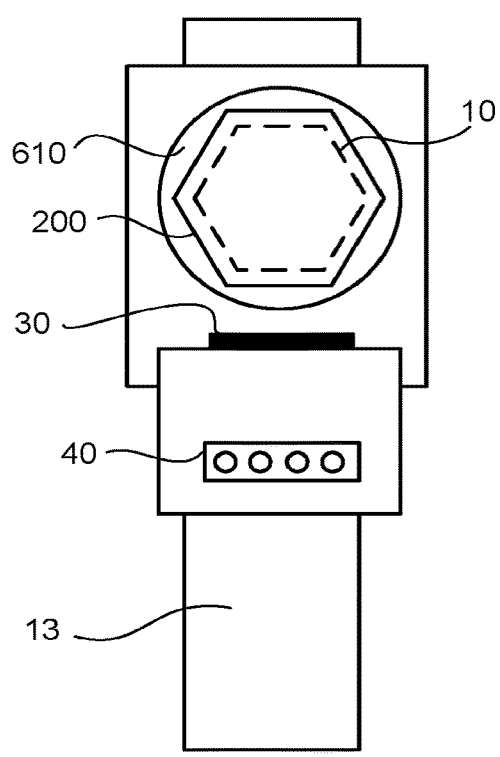
FIG. 2 shows, in a front view and in a schematic manner, the device of the invention shown in FIG. 1.

The first part of the sensor member 20 comprises, for example, a cap 200 (FIGS. 1 and 2), made of plastic material and arranged to be clipped on to the head 10 of the screw, so as to be rotationally fixed to said screw when the latter is screwed in or out. The size of the cap is adapted for fastening to the screw head, according to the size of the latter.

Figure 5A:
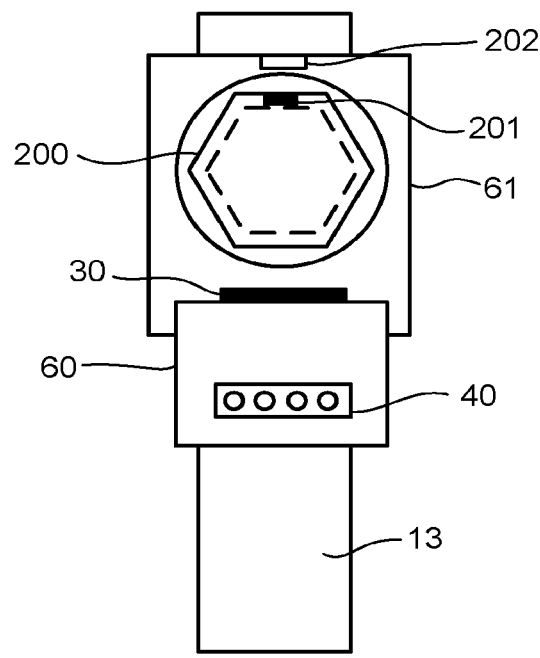
Figure 5B:
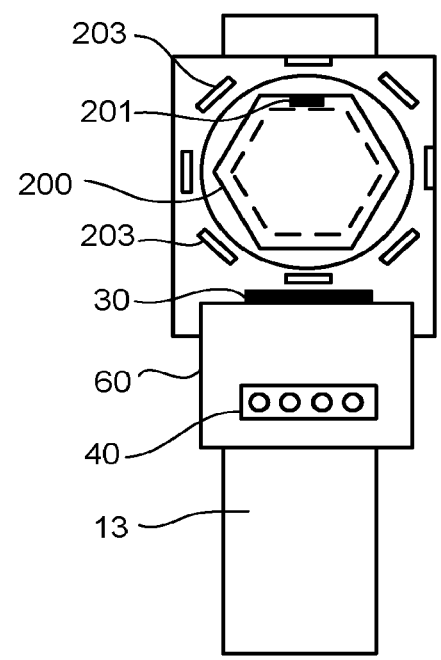

With reference to FIGS. 5A and 5B, the sensor member 20 may have two different architectures:
- In FIG. 5A, the first part of the sensor member 20 comprises a permanent magnet 201 fastened to the cap 200, and the second part comprises a Hall effect sensor 202 for measuring the magnetic field emitted by the permanent magnet 201. The Hall effect sensor 202 generates a signal which is sent towards the first detection unit 21, this signal being dependent on the position of the permanent magnet 201. The first detection unit 21 determines the degree of tightening of the screw according to the signal received from the Hall effect sensor 202.
- In FIG. 5B, the first part again comprises a permanent magnet 201 fastened to the cap 200, and the second part comprises a plurality of detection members distributed over the whole periphery of the screw head and each capable of generating a binary signal corresponding to their closed or open state. The detection members are fixed relative to the screw. They are, for example, magnetically actuated microswitches 203, such as reed switches. Each microswitch 203 is connected to the first detection unit 21. According to the closed or open state of each microswitch 203, the first detection unit 21 determines the position of the permanent magnet 201, from which it deduces the degree of tightening of the screw.

Advantageously, the first detection unit 21 determines the degree of tightening of the screw by comparison between the signal received from the sensor member 20 corresponding to an angular position of the screw with an initially measured signal corresponding to the angular position of the screw when it is fully tightened, or a stored signal corresponding to a specified value of tightening. If the difference between the two signals exceeds a specified value, the first detection unit 21 activates an alarm.

For its part, the temperature detector comprises a sensor member 30 (FIGS. 1 and 2), for example a component of the thermistor type with a positive temperature coefficient (PTC) or a negative temperature coefficient (NTC), and a second detection unit 31 comprising at least one input, designed to receive the temperature values measured by the sensor member 30, and at least one output. This second detection unit 31 is, for example, arranged to determine whether a temperature value exceeds a specified stored threshold. The sensor member 30 of the temperature detector is, for example, positioned as far away as possible from the screw head, in order to obtain the most precise measurements possible.

The first detection unit 21 and the second detection unit 31 may be made in the form of a microcontroller, or each may be made using discrete electronic components. According to the architecture, the data will be analogue or digital.

Advantageously, the device comprises a signalling unit 40 connected to the output of the first detection unit 21 and to the output of the second detection unit 31. This signalling unit 40 is designed to warn the operator about the state of the screw, in terms of its temperature and/or its degree of tightening. This signalling unit 40 comprises, for example, a plurality of indicator lamps 400.

Advantageously, the device comprises a power supply system designed to supply electrical energy to the first detection unit 21, the second detection unit 31, and the signalling unit 40.

Advantageously, with reference to FIG. 3, the power supply system comprises an electrical energy generator arranged to generate electrical energy in a stand-alone manner. This system generates the electrical energy by induction. It comprises at least a current transformer having a core to be placed around said conducting bar forming the primary of the transformer, and a winding provided around the core and forming the secondary of said transformer, to recover electrical energy when an electric current flows in the electrical conductor. The core is, for example, in the form of a torus 50 that can be opened to be placed around the bar 13. The system further comprises an electronic circuit 51 which is connected to the torus in order to recover the generated electrical energy, and which distributes this energy to the different units of the device.

Preferably, the device comprises a main housing 60 in which are placed the first detection unit 21, the second detection unit 31, the signalling unit 40, and the power supply system. This housing has a central opening so that the conducting bar can be passed through the torus of the power supply system. The sensor member 30 of the temperature detector is fastened to the main housing 60 so that it can sense the temperature. It is then positioned near the screw.

The device further comprises a first secondary housing 61 through which an opening 610 is formed to allow the screw head to pass through. This secondary housing 61 carries the second part of the sensor member 20 of the screw tightening detector. As mentioned above, the first part of this sensor member is fastened to the cap 200 placed on the screw head at the position of the opening formed in the secondary housing 61.

Figure 4:
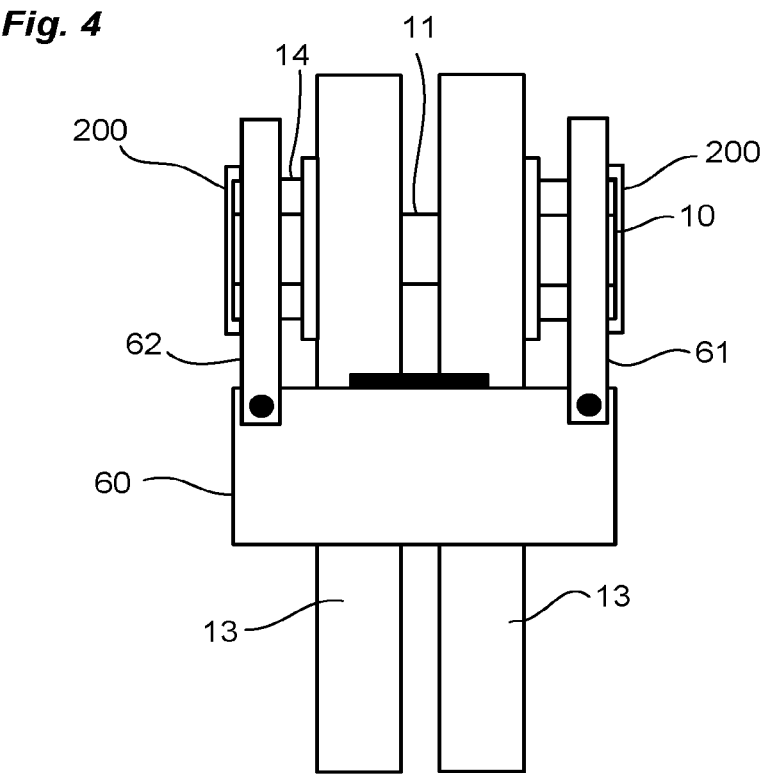
FIG. 4 shows an improvement of the device shown in FIGS. 1 and 2, and FIGS. 5A and 5B show two variant embodiments used in the device of the invention to determine the degree of tightening of a screw.

With reference to FIG. 4, the device may also comprise a second secondary housing 62 of the same type as the first, connected to the main housing. This second housing is designed to be positioned around the nut 14 screwed on to the end of the screw, to capture the tightening and temperature information at the position of the nut. This variant is suitable when the screw is arranged to pass through two conducting bars 13, with the nut 14 bearing against the second bar. A cap similar to the cap 200 described above will be used for positioning on said nut 14.

Each secondary housing may be mounted on a hinge mechanism formed on the main housing, so that it can pivot relative to the latter.

According to the invention, the two detection units may be arranged to communicate with one another in order to correlate the information related to the temperature and to the degree of tightening.

By way of improvement, the device may comprise a data transmitter arranged to transmit the data on the temperature and/or degree of tightening to a remote receiver, so that the information can be collected. The data may be transmitted by any known wireless communication solution such as Bluetooth. This information may be sent to a server. A terminal, for example a smartphone or a tablet, may comprise an application for connection to said server for the display of this information.

The device of the invention thus has many advantages, including the following:

It enables the tightening state and the temperature state of each clamping screw to be known rapidly, without using an external measurement device.

It is a stand-alone device in terms of electrical energy, and therefore requires no special maintenance.

It is easily and rapidly installed.

It is particularly compact.

The invention claimed is:

1. A device for monitoring a temperature and tightening of a screw, said screw including at least a head and a shank that clamps one or more electrical conductors, said device comprising:
    a temperature detector positioned near the head for measuring the temperature of the screw; and
    a detector that detects the tightening of the screw, the detector including a sensor, and the sensor including
        a first part, positioned on a cap fastened to the head so as to be rotationally fixed to and in contact with said screw,
        a second part, fixed relative to the first part and configured to generate a detection state of the sensor representing a position of the first part relative to the second part, and
        circuitry configured to
            receive a signal, that indicates the generated detection state, from the second part, and
            determine a degree of tightening of the screw according to the signal.

2. The device according to claim 1, wherein the first part is a permanent magnet.

3. The device according to claim 2, wherein the sensor includes a Hall effect sensor configured to measure a magnetic field generated by said permanent magnet.

4. The device according to claim 2, wherein the sensor includes one or more magnetically actuated microswitches.

5. The device according to claim 1, wherein the temperature detector includes a component of a thermistor type.

6. The device according to claim 5, wherein the circuitry is further configured to signal the degree of tightening the screw and/or a temperature state based on the temperature of the screw.

7. The device according to claim 6, further comprising:
    an electrical power supply system arranged to supply electricity to the temperature detector, and to the circuitry.

8. The device according to claim 7, wherein the power supply system includes an inductive electrical energy generator which includes at least a current transformer having a core to be placed around the one or more electrical conductors forming a primary of the current transformer, and a winding provided around the core and forming a secondary of the current transformer, to recover electrical energy when an electric current flows in the one or more electrical conductors.

9. The device according to claim 8, wherein the core is shaped in the form of a torus designed to surround the one or more electrical conductors.

10. The device according to claim 8, further comprising:
    an electronic circuit connected to a secondary of the transformer, the electronic circuit having means for storing the generated electrical energy.

11. The device according to claim 1, wherein the second part includes magnetically actuated microswitches which are distributed over a periphery of the head.

12. The device according to claim 11, wherein each microswitch of the magnetically actuated microswitches is configured to generate a binary signal based on a closed or open state of the microswitch.

13. The device according to claim 1, wherein the signal indicates an angular position of the screw, and the circuitry is configured to determine the degree of tightening of the screw by comparing the angular position of the screw with an initially measured signal indicating an initial angular position of the screw when the screw is fully tightened, or a stored signal indicating a specified angular position.

14. The device according to claim 13, wherein the circuitry activates an alarm when a difference between the signal and the initially measured signal or the stored signal exceeds a stored value.

15. The device according to claim 1, wherein the circuitry is further configured to determine whether the temperature of the screw exceeds a stored threshold.

* * * * *

UNITED STATES PATENT AND TRADEMARK OFFICE
CERTIFICATE OF CORRECTION

PATENT NO.         : 10,365,122 B2
APPLICATION NO.    : 15/267477
DATED              : July 30, 2019
INVENTOR(S)        : Josep Lopez et al.

Page 1 of 1

It is certified that error appears in the above-identified patent and that said Letters Patent is hereby corrected as shown below:

On the Title Page

Column 2, item [56], Line 1, delete "W)2013114687A1." and insert -- WO201313114687A1. --, therefor.

Signed and Sealed this
Twenty-fourth Day of December, 2019

Andrei Iancu
*Director of the United States Patent and Trademark Office*